United States Patent
Keller

(10) Patent No.: US 11,400,628 B2
(45) Date of Patent: Aug. 2, 2022

(54) METHOD FOR PRODUCING DECORATIVE PARTS

(71) Applicant: HIB TRIM PART SOLUTIONS GMBH, Bruchsal (DE)

(72) Inventor: Bernd Keller, Walzbachtal-Jöhlingen (DE)

(73) Assignee: HIB TRIM PART SOLUTIONS GMBH, Bruchsal (DE)

( * ) Notice: Subject to any disclaimer, the term of this patent is extended or adjusted under 35 U.S.C. 154(b) by 672 days.

(21) Appl. No.: 15/752,344

(22) PCT Filed: Apr. 28, 2016

(86) PCT No.: PCT/EP2016/059537
§ 371 (c)(1),
(2) Date: Feb. 13, 2018

(87) PCT Pub. No.: WO2017/028968
PCT Pub. Date: Feb. 23, 2017

(65) Prior Publication Data
US 2020/0198196 A1 Jun. 25, 2020

(30) Foreign Application Priority Data
Aug. 19, 2015 (EP) .................................. 15181568

(51) Int. Cl.
| | |
|---|---|
| *B29C 45/14* | (2006.01) |
| *B29C 45/03* | (2006.01) |
| *B29C 45/76* | (2006.01) |
| *B29K 75/00* | (2006.01) |
| *B29L 31/30* | (2006.01) |

(52) U.S. Cl.
CPC ........ *B29C 45/14065* (2013.01); *B29C 45/03* (2013.01); *B29C 45/76* (2013.01); *B29C 2945/76498* (2013.01); *B29C 2945/76772* (2013.01); *B29K 2075/00* (2013.01); *B29L 2031/3005* (2013.01)

(58) Field of Classification Search
CPC ........................................... B29C 2045/14213
See application file for complete search history.

(56) References Cited

U.S. PATENT DOCUMENTS

| | | | | |
|---|---|---|---|---|
| 5,699,835 A * | 12/1997 | Nakagawa | ............... | F16L 9/133 |
| | | | | 138/141 |
| 5,928,464 A * | 7/1999 | Scharrenberg | .... | B29C 45/14795 |
| | | | | 156/500 |
| 6,322,739 B1 * | 11/2001 | Andersson | ............... | B29C 35/16 |
| | | | | 264/250 |

(Continued)

*Primary Examiner* — Alison L Hindenlang
*Assistant Examiner* — Virak Nguon
(74) *Attorney, Agent, or Firm* — Scully Scott Murphy and Presser

(57) ABSTRACT

The invention relates to a method for producing decorative parts with a rear plastic carrier element, which is poured over with plastic under process pressure in a casting tool for producing an upper layer on a front visible side, characterized in that the carrier element is fixed in the casting tool and is impinged upon with pressure at least during the production of the upper layer at the rear and in the direction of the upper layer that is to be produced on the front visible side, said pressure counteracting the process pressure during the overmolding with plastic.

9 Claims, 1 Drawing Sheet

(56) References Cited

U.S. PATENT DOCUMENTS

| | | | |
|---|---|---|---|
| 2002/0185766 A1* | 12/2002 | Daihisa | B29C 45/14065 264/39 |
| 2005/0184420 A1* | 8/2005 | Biewer | B29C 44/587 264/51 |
| 2006/0099395 A1* | 5/2006 | Cowelchuk | B29C 44/1228 428/304.4 |
| 2008/0215021 A1* | 9/2008 | Cisko Jr. | A61F 5/453 604/349 |
| 2012/0181731 A1* | 7/2012 | Dudziak | B29C 45/1418 264/510 |

* cited by examiner

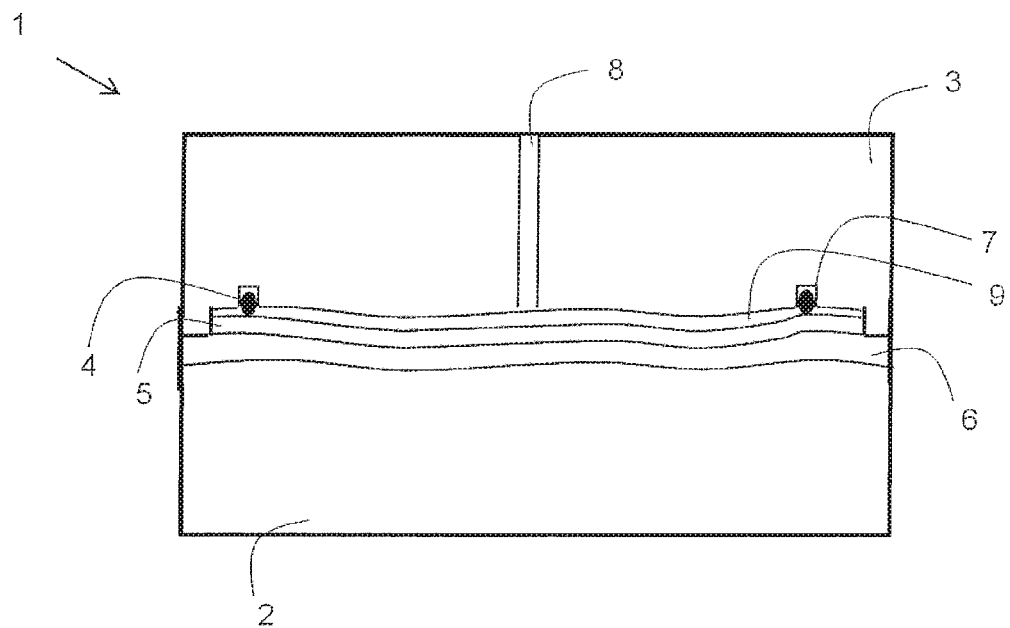

METHOD FOR PRODUCING DECORATIVE PARTS

FIELD

The invention relates to a method for producing decorative parts with a rear plastic carrier element and a plastic upper layer to be applied on the front side in a casting method. The invention also relates to a casting tool adapted to the method.

BACKGROUND

Decorative parts are used in vehicle inside spaces as cover elements and comprise a carrier element for fastening to the vehicle and comprise material layers such as, for example, wooden veneer layers, aluminum layers, carbon fiber mats or leather which are optionally applied on them and face the visible side. The material layers are overmolded in the plastic casting tool with plastic which forms the visible side of the decorative part as the upper layer.

It is known from the prior art that the carrier elements can be produced in the injection-molding method. Due to the frequently complex geometry the rear side of the carrier element is made quite free, wherein it loses stability and rigidity at least in sections to a considerable degree. It is problematic here that the process pressure of the plastic acting during the overmolding on the front, visible side of the carrier element has the result that the carrier element curves toward the rear in areas. As a result, the amount of plastic in the upper layer which is applied in these areas increases, as a result of which the wall thickness of the structural component is locally enlarged with inhomogeneous transitions to the adjacent surface on the visible side. It is immaterial here whether the upper layer is constructed compactly or is foamed. As soon as the process pressure drops after the conclusion of the casting method the carrier element deforms back into its original position and the local enlargements of the wall thicknesses of the structural components can be recognized as an excess curvature in the opposite direction practically as a hill on the visible side. Differences in the wall thickness of the structural components of a few micrometers are already sufficient that they can be detected by the human eye. The differences in the wall thickness of the structural components must therefore be expensively removed again with additional reworking processes.

The invention therefore has the basic problem of making a method available with which reworking steps are avoided after the overmolding process with plastic and a level surface is achieved directly in the casting tool. Furthermore, the invention has the problem of making a corresponding casting tool available.

SUMMARY

According to the invention a method for producing decorative parts with a rear plastic carrier element is suggested which is overmolded in a casting tool for producing an upper layer on a front, visible side with plastic under process pressure, wherein the carrier element is fixed in the casting tool and is loaded by a pressure at least during the production of the upper layer on the rear and in the direction of the upper layer to be produced on the front, visible side, which pressure counteracts the process pressure during the overmolding with plastic.

The pressure on the rear of the carrier element during the overmolding process stabilizes the carrier element and in particular its areas with weakened material so that it does not curve during the overmolding but rather retains its initial form for the entire time.

An embodiment of the method according to the invention is especially favorable in which the carrier element is loaded with pressure in the casting tool in a planar manner, in particular in a completely planar manner in the direction of the upper layer to be produced on the front side. The pressure acting in a planar manner stabilizes the carrier element during the overmolding process in all areas and reliably prevents a curving over the entire surface.

In an advantageous embodiment of the method the pressure is produced by compressed gas, in particular compressed air which is pressed into a cavity between an upper tool and the carrier element. Compressed gas or compressed air has the particular advantage that it, in contrast to all liquids, leaves no residues on the carrier element and is simple to manage. Compressed air is the most economical variant.

In order to ensure an action of pressure exclusively on the rear side of the carrier element, it is provided in the method that a seal is arranged between the upper tool and the carrier element which seals the cavity at least during the production of the upper layer. The seal can be integrated in the tool or in the carrier element or can be provided as an extra structural component.

According to the invention, in an advantageous embodiment the maximum pressure is greater than or equal to the maximum process pressure during the overmolding. This ensures that a curving in the direction of the rear side of the carrier element is excluded. 30 bar is applied as the maximum pressure, for example, in injection-molded polymeric carrier elements.

Furthermore, an embodiment provides that the pressure is retained in the method as long as the process pressure of the overmolding is acting. However, the pressure can also act until the upper layer cast from plastic has hardened.

A control is advantageously provided for applying and controlling the pressure regarding its level and active time. This control furthermore makes it possible that the pressure is applied in several pressure stages with different pressure values. Therefore, it is made possible that the applied pressure is reduced step-by-step after the conclusion of the overmolding in order to exclude to the extent possible deformations on the carrier element.

The method is used with polyurethane as overmolding plastic, wherein compact, hard, soft or foamed PUR systems can be used. The plastics can be transparent, semitransparent or also colored.

Also, all material layers known and current from the prior art (films, veneers, fiber mats, leather, etc.) can be arranged on the visible side of the carrier element and be overmolded with plastic, especially polyurethane in the method according to the invention.

Another component of the invention is a casting tool adapted for carrying out the previously described production method with an upper tool and a lower tool which comprise between themselves a hollow receiving space for the carrier element in the closed state which can be overmolded with plastic on the visible side facing the lower tool, wherein the upper tool comprises a passage extending outward from the hollow receiving space to which passage a producer of compressed gas, preferably a producer of compressed air can be connected so that the hollow receiving space can be loaded at least in sections with compressed gas, in particular compressed air. Therefore, the casting tool offers the possibility of building up a planar pressure on the rear side of the carrier element in order to achieve the described technical effect.

Furthermore, it is provided for the casting tool in an embodiment that a groove is provided in the upper tool on an inner side directed towards the lower tool into which groove a seal can be introduced for sealing the cavity between the carrier element and the upper tool. Therefore, the cavity can be sealed for the production of compressed air from the area of the plastic to be overmolded on the visible side of the carrier element.

An alternative embodiment provides that the casting tool itself comprises the producer of compressed gas. This can be achieved, for example, by integrating an air compressor which communicates with the passage in the upper tool.

The control can also be integrated into the casting tool in order to control the level and the acting time of the pressure applied by the producer of compressed gas, in particular the producer of compressed air.

BRIEF DESCRIPTION OF THE DRAWING

FIG. 1 shows a schematic side view of a casting tool for carrying out the method.

DETAILED DESCRIPTION

Other advantageous further developments of the invention are characterized and are shown in detail in the following together with the description of the preferred embodiment of the invention using the FIGURE.

FIG. 1 shows by way of example in a schematic fashion a side view of a bipartite casting tool 1 with an upper tool 3 and a lower tool 2. In the closed state shown, a hollow receiving space is formed between the upper tool 3 and the lower tool into which space the carrier element 5 is inserted and fixed in such a manner that the hollow receiving space forms an open space between carrier element 5 and lower tool 2 and forms a cavity 9 between carrier element 5 and upper tool 3. The carrier element 5 is overmolded in the casting tool 1 on its visible side facing the lower tool 2 in order to produce the upper layer with polyurethane under process pressure, wherein the process pressure acts in the direction of the upper tool 3. The upper tool comprises a passage 8 extending out from the hollow receiving space and the cavity 9 to which passage a compressor which is not shown is connected in order to load the carrier element 5 with a pressure by compressed air at least during the production of the upper layer on the rear side and in the direction of the lower tool 2, i.e., the top layer to be generated on the front, visible side, which pressure counteracts the process pressure during the overmolding with plastic. In order to seal the cavity 9, a seal 4 is inserted between the carrier element 5 and the upper tool 3 which seal extends partially into a groove 7 formed on the upper tool 3 and directed toward the lower tool 2.

In the method for producing the decorative part, for example the injection-molded carrier element is fixed with a material layer (film, veneer, fiber mat or leather, etc.) in the casting tool 1 in such a manner that the cavity 9 is sealed, and subsequently polyurethane is pressed by the customary process pressure into the free space 6. At the same time a planar counterpressure acting on the carrier element 5 is produced via the passage 8 by compressed air and maintained until the process pressure can be reduced. Subsequently, even the pressure of the compressed air can be adapted in several pressure steps. The time of the application of pressure is variable and can be adapted by a control which is not shown to the process of the introduction of plastic or polyurethane.

The invention is not limited in its implementation to the previously indicated preferred exemplary embodiments but rather a number of variants is conceivable which make use of the presented solution even in basically differently designed embodiments. For example, the shapes and thicknesses of the carrier element and of the plastic layer to be applied can be varied. Also, different injection-molding polymers, carrier constructions (homogeneous or multilayer), carrier wall thicknesses, PUR systems (compact, foamed-on, hard, soft), a variable arrangement of the seal, for example on the casting tool or on the carrier element, different sealing materials as well as variable surface structures are comprised.

What is claimed is:

1. A method for producing decorative parts with a rear plastic carrier element which is overmolded in a casting tool for producing an upper layer on a front, visible side with a plastic under process pressure, characterized by:
   providing a casting tool for producing decorative parts with a rear plastic carrier element which is overmolded in the casting tool to produce an upper layer on a front, visible side with a plastic under process pressure, the rear plastic carrier element having an initial form;
   fixing the rear plastic carrier element in the casting tool; and
   loading by pressure the rear plastic carrier element at least during the production of the upper layer on the rear plastic carrier element and in the direction of the upper layer to be produced on the front, visible side, the pressure counteracting the process pressure during the overmolding with the plastic, and preventing the curving of the rear plastic carrier element which retains its initial form, and
   wherein the pressure is produced by compressed gas, which is pressed into a cavity between an upper tool and the rear plastic carrier element, wherein the compressed gas is in direct contact with the rear plastic carrier; and wherein the pressure has a maximum pressure that is greater than or equal to a maximum pressure of the process pressure.

2. The method according to claim 1, wherein the pressure is loaded in a planar manner in the direction of the upper layer to be produced on the front, visible side.

3. The method according to claim 1, wherein a seal is arranged between the upper tool and the rear plastic carrier element which seals the cavity at least during the production of the upper layer.

4. The method according to claim 1, wherein the pressure is maintained at least as long as the process pressure of the overmolding is acting.

5. The method according to claim 1, wherein a controller is provided which controls the level of the pressure.

6. The method according to claim 1, wherein the pressure is applied in several pressure stages with different pressure values.

7. The method according to claim 1, wherein the pressure is reduced step-by-step after the conclusion of the overmolding.

8. The method according to claim 1, wherein the rear plastic carrier element is an injection-molded plastic carrier.

9. The method according to claim 1, wherein polyurethane is cast as the plastic.

\* \* \* \* \*